United States Patent Office 3,069,390
Patented Dec. 18, 1962

3,069,390
POLYMERIC AMIDES FROM POLYMERIC ACRYLIC ACID ESTERS AND N-AMINOALKYL ALKANOL AMINES AND REACTION PRODUCTS THEREFROM
Milton W. Kline, Philadelphia, Pa., Robert B. Dean, Bainbridge, N.Y., and Samuel Loshaek, Hatboro, Pa., assignors to The Borden Company, New York, N.Y., a corporation of New Jersey
No Drawing. Filed July 17, 1959, Ser. No. 827,684
8 Claims. (Cl. 260—72)

This invention relates to water soluble polymeric amides having therein reactive amino groups and being soluble in both water and hydroxy organic compounds such as the monohydric and polyhydric alcohols.

Aminolysis of certain polymeric acrylic esters, to give polyamides wherein at least one of the amide hydrogens is substituted by an alkylamino group, has been known heretofore.

We have now discovered that we can make amides of this general class of increased reactivity when the amino group is disposed between two primary carbon atoms, as in the structure including the unit

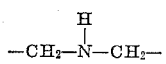

the increased reactivity resulting from the absence of secondary and tertiary carbon atoms attached to nitrogen of the amino group. In other words the N is joined to H and to two $CH_2$ groups, both of which are unsubstituted. We can also obtain a primary alcohol group $-CH_2OH$, giving an additional point for further reaction, i.e., a hydroxy group in a terminal position in the molecule.

The invention comprises the herein described polymeric amides of acrylic or methacrylic acid in which the amide is N-substituted by the alkylaminoalkyl radical. An example of the substituted amide group is

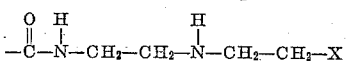

The invention comprises also the process of reacting a polymer or copolymer of an alkyl ester of acrylic or alpha-alkyl acrylic acid with a polyamide having primary and secondary amino groups and suitably also a terminal hydroxyl group, i.e., with an amino alkanolamine. The process is illustrated by the following equations for the reaction of a polymer of an alkyl ester of an alpha-alkyl acrylic acid with (1) an aminoalkylalkanol amine and (2) an N-amino alkyl piperazine.

(1)
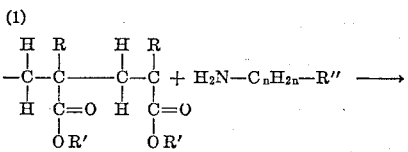

(2)
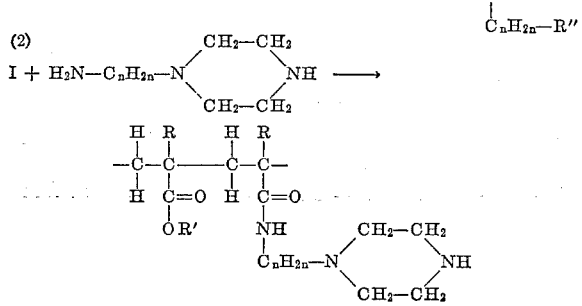

In the Equation 1, R″ represents an alkanol amine residue

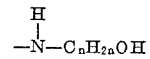

In these formulas R represents hydrogen, chlorine, or any $C_1$–$C_2$ alkyl, R′ an alkyl having 1–4 carbon atoms, $n$ an integral number within the range 2–8, R″ is a radical containing a hydrogen atom attached directly to the nitrogen of a secondary amine radical selected from the group consisting of

and

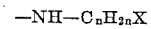

so that the nitrogen in R″ is joined to a hydrogen and to two hydrocarbon units both of which are unsubstituted, and X is selected from the group consisting of hydrogen, hydroxyl, and alkyl groups having 1–2 carbon atoms. When the product is to be at least moderately soluble in water, $n$ should be 2–4.

Our polymers and copolymers dissolve readily in water and in aqueous acids as well as in methanol, ethanol, isopropanol, ethylene glycol, glycerin and like organic compounds containing a high proportion by weight of hydroxy group. They are useful as a spray for setting human hair, as by application in a solution in ethanol or isopropanol with any conventional hair spray device using, for instance, dichlorotetrafluoroethane, dichlorodifluoromethane, or trichloromonofluoromethane, to create the spraying pressure.

The solutions of these polymers and copolymers in water are also useful as dispersing agents in the aqueous suspension polymerization of vinyl and acrylic monomers such as vinyl chloride, vinyl acetate, styrene, and methyl, ethyl, and other esters of acrylic and methacrylic acid. In addition these polymers and copolymers serve as good prime coatings for metals such as aluminum or steel. In such cases the material is applied to the metal from an aqueous or alcoholic solution and the solvent evaporated at moderate temperatures, e.g. below 150° F. When such coatings are baked on the metal at 300°–350° F., excellent adhesion to the metal results.

The films prepared from aminolyzed polymers of methyl or ethyl acrylate or methacrylate are hard. These films may be made softer and more flexible by the addition of materials which act as plasticizers for these aminolyzed polymers, such as ethylene, butylene and diethylene glycols, glycerol, and sorbitol and like high boiling, alcoholic compounds. An alternative method for preparing flexible films is to aminolyze copolymers prepared by copolymerizing major proportions such as 60%–95% of alkyl acrylates or methacrylates having 1–2 carbon atoms in the alkyl groups, as in methyl acrylate, ethyl acrylate and methyl methacrylate with minor proportions such as 5%–40% of alkyl acrylates or methacrylates having 3–12 carbon atoms in the alkyl groups such as butyl acrylate and decyl acrylate. The ester groups in these latter monomers are highly resistant to aminolysis as described in this invention; therefore these groups act as internal plasticizing agents.

As the polymers to be aminolyzed, we use the poly-(alkyl acrylates) or poly(alkylmethacrylates) having in the said alkyl 1–4 carbon atoms as in methyl, ethyl, propyl, butyl and isobutyl. We can also aminolyze the interpolymers prepared from two or more different monomers taken from each of the above defined monomeric groups, any combination of two or more monomers taken from both groups, or any combination of two or more monomers at least one of which is selected from said groups and the others are selected from the group consisting of polymerizable ethenoid monomers such as vinyl acetate, vinyl chloride, vinyl chloroacetate, styrene or substituted styrenes, and poly(alkyl acrylates) and poly(alkyl methacrylates) having in the said alkyl more than 4 carbon atoms. When a material other than the $C_1$–$C_{12}$ alkyl acrylate esters is used, the proportion of the other monomer is ordinarily less than that of the $C_1$–$C_{12}$ alkyl acrylate as, for instance 5–15 parts of the other monomer for 100 of the alkyl acrylate.

As the polyamine to be used in the aminolysis of the polyacrylic or polymethacrylic ester, we use N-aminoethylethanolamine, N-aminoethyl piperazine, or any polyamine that contains not only a primary amine group but also a secondary amine group joined between two primary carbon atoms. Further advantages may be provided if the amine selected should contain also a primary alcohol group.

As to proportions, we react approximately 0.50–0.85 mole of the polyamine with 1 base mole of the ester in the polymeric acrylate or methacrylate. To obtain reaction to this extent we use actually more than 1 mole of the polyamine and ordinarily about 1–5 moles for 1 base mole of the ester in the polymer. An excess of the amine over the amount which is to be combined in the finished product decreases the amount of reaction of the secondary amine group with the ester, thus preserving more fully this group for later reactivity, as well as preventing crosslinking of the polymer to an insoluble product.

In general, the selected polymeric acrylic or methacrylic ester and the selected polyamine are reacted, for convenience, in a solvent whose reflux temperature is about that desired for the particular reaction. A satisfactory solvent is any xylene (boiling point about 137°–144° C.), benzene, toluene, and chloro- and dichlorobenzenes. The mixture is refluxed for a period of about 6–48 hours. Aminolysis is shown by a gradual precipitation of a gummy material from the solvent. After no more precipitate forms, the heating is discontinued and the supernatant solvent is decanted, to leave a gummy syrup consisting of a mixture of the aminolyzed polymer and residual excess amine.

The time of reaction is made longer (or shorter) if a lower (or a higher) boiling solvent is used. The temperatures and times are so chosen as to give the desired degree of aminolysis (60%–85%) without objectionable crosslinking.

The residual excess amine is removed from the gummy polymer by extracting the amine from the polymer as by mixing the polymer vigorously and repeatedly with a large volume of acetone or other liquid that is a solvent for the amine and a non-solvent for the polymer. Other solvents that we can use for this purpose are methyl ethyl ketone, methyl isobutyl ketone, cyclohexanone, and other ketones, acetonitrile; ethylene dichloride; dioxane, tetrahydrofuran, and like cyclic ethers.

The invention is further illustrated by description in connection with the following specific examples. In these examples and elsewhere herein proportions are expressed as parts by weight unless specifically stated to the contrary.

*Example 1*

A solution of 25 g. (0.25 base mole) of poly(methyl methacrylate) of number average molecular weight $5 \times 10^4$, 130 g. of N-aminoethyl ethanolamine (1.25 moles), and 150 g. of xylene was stirred and heated under reflux for 24 hours in a flask fitted with stirrer and reflux condenser. The mixture was then cooled and the supernatant liquid decanted from the sticky amber syrup beneath it. This syrup was then tumbled with 1 liter of acetone for 2–3 hours, giving a white gummy material. The acetone was decanted and the gummy product was broken into small pieces, which were then ostracized thoroughly for 0.5 hr. in 1 liter of additional acetone using a Brookfield counter-rotating stirrer. The hard tan-colored powder obtained in this manner was filtered free of acetone and re-ostracized twice more as described above, to remove unreacted N-aminoethyl ethanolamine.

The tan colored powder was then dried in a vacuum oven overnight, giving 25.2 g. of tan-colored powder containing 10.0% N. The theoretical value of nitrogen for complete substitution of the methyl alcohol groups by the aminoethyl ethanolamine groups is 16.3. Hence 61.3% of the methyl alcohol groups have been substituted. The infra-red spectrum of the material confirms the presence of the amide structure shown in the equation above.

This polymer dissolves readily in water and also in aqueous acid such as dilute hydrochloric acid. The film cast from an aqueous solution of this material is hard and clear.

*Example 2*

The procedure and proportions of Example 1 are used except that the amine which is mixed with the poly(methyl methacrylate) is replaced by 1.25 moles of aminoethyl piperazine. The hard polymer is so obtained dissolved readily in water and also in aqueous acid.

*Example 3*

The procedure and compositions of Examples 1 and 2 are used in turn except that 25 g. of poly(ethyl acrylate) are substituted for the 25 g. of poly(methylmethacrylate) there used. The product so obtained contained 13.5% N and was soluble in water, aqueous acid, and alcoholic solvents such as methanol or ethanol. This product was found to be an excellent suspending agent for the polymerization of vinyl monomers. Thus 0.3 part of the aminolyzed polymer, 0.1 part of lauroyl peroxide, 25.0 parts vinyl chloride, 5.0 parts vinyl acetate, and 70.0 parts deionized water were charged into a pressure bottle which was then capped and agitated at 250 strokes per minute at 60° C. for 10 hours. The resulting copolymer (30 parts) was a fine white colored powder.

*Example 4*

A mixture of 42 g. (equivalent to 0.25 base mole of ester groups) of a 51.2% solution in xylene of a copolymer of methyl methacrylate and methyl acrylate (75%: 25% by weight, respectively), of number average molecular weight $2 \times 10^4$, 130 g. of N-aminoethyl ethanolamine, and 125 ml. of additional xylene was stirred and heated under reflux for 24 hours. The resulting copolymer (25.2 g.) was isolated and purified as described in Example 1.

The product was a tan-colored powder, containing 12.1% nitrogen (equivalent to 75% aminolysis), and was soluble in water and aqueous hydrochloric acid and other acids.

*Example 5*

The procedure and composition of Example 4 were followed except that the methyl methacrylate-methyl acrylate copolymer was replaced by an equal weight of a copolymer of 85 parts of ethyl acrylate and 15 parts of octyl acrylate and the final product was isolated with hexane instead of acetone. The final polymeric amide, resulting from the process, is less hard than the amide produced in Example 4 and, when formed into a film, is very flexible. The product is soluble in aromatic and ketonic type solvents such as toluene and acetone.

*Example 6*

To a solution of 10 parts of the polymeric amide prepared in Example 1 in 100 parts of water, 1 part (10% based on the polymer) of glycerol was added. The film cast from the resulting solution was clear but soft and flexible, indicating the plasticizing ability of non-volatile alcoholic compounds on the polymeric amides described in this patent.

*Example 7*

The procedure and composition of Example 4 were followed except that the methyl acrylate-methyl methacrylate copolymer was replaced by an equal weight of a terpolymer of 60 parts of ethyl ethacrylate, 37 parts of methyl methacrylate and 3 parts of methacrylic acid. The final polymeric amide, resulting from the process, is hard and dissolves readily in water and aqueous acid. The film cast from an aqueous solution of this material is hard and clear.

*Example 8*

The procedure and composition of Example 1 are followed except that the poly(methyl methacrylate) there used is replaced, in turn, by an equal weight of any of the other poly(acrylic esters) or any of the other polymers disclosed herein and the N-aminoethyl ethanolamine is replaced by an equimolar proportion of any of the other amines disclosed herein.

All of the polymeric amides made as described are reactive with formaldehyde, (urea and substituted urea)-formaldehyde resins, (phenol and substituted phenol)-formaldehyde resins and (melamine and substituted melamine)-formaldehyde resins containing methylol or alkoxy methyl groups, such reactivity depending upon the secondary amino group.

The products of this further reaction may be controlled to give thermoset coatings, as for example on paper. Said resins may be formed in situ in the presence of the polymeric amides or may be prepared first in a separate reaction and then combined with the polyamides for further reaction. This secondary amino group is also reactive with an acid including hydrochloric, sulphuric, acetic or benzene sulfonic, in each case to give a polycationic surfactant. The secondary amino group also reacts rapidly with epoxide groups such as are found in ethylene oxide, epichlorohydrin etc., to produce chemically cross-linked coatings. When the epoxy-containing compound is added to a solution of the aminolyzed polymer, a gel is obtained almost instantaneously, indicative of cross-linking or thermosetting. Those of the polymeric amides that have the OH group attached to a terminal carbon, that is, in a primary alcohol group, are also reactive with methylol or alkoxy methyl groups in urea formaldehyde resins and other like resins to give ether linkages and thus produce polymeric thermoset coating materials and wetting agents.

*Example 9*

A solution of 10 parts of the aminolyzed polymer prepared as described in Example 3 and 5.4 parts of 37% aqueous formaldehyde in 40 parts of water was placed in a flask equipped with stirrer, condenser and thermometer and adjusted to pH 5.0 with 6 N/HCl. The solution was then heated with stirring at 50° C. for 40 minutes to give a clear resin. On heating for 20 minutes additional at 80° C., a precipitate formed indicating that a cross-linked resinous product was formed. This illustrates the reactivity of the polyamide with methylol groups of formaldehyde. Similar reactions are obtained if instead of aqueous formaldehyde solutions of formaldehyde in ethyl or butyl alcohol are used. In such solutions the methylol group is replaced by ethoxy methylol or butoxy methylol group, respectively. This illustrates that the ethoxy-methyl or butoxy-methyl group is a suitable alternative to the methylol group.

*Example 10*

An example of the reaction of the amide made as described above with methylol groups which may be attached to resinous molecules is the following:

(*a*) A solution of 10.5 parts of the aminolyzed polymer prepared as described in Example 3, 28.5 parts urea, and 30.4 parts formaldehyde in 140 parts water was placed in a flask equipped with stirrer, condenser and thermometer and adjusted to pH 5.0 with 6 N/HCl. The solution was then heated with stirring at 60°–70° C. for 30 minutes and cooled rapidly. A portion of the resulting solution (I) was diluted to 0.5% solids and applied to ½" wide strip of Whatman #1 filter paper. The impregnated filter paper was heated for 1 hour at 110° C. A solution (II) similar to I, but containing no aminolyzed polymer, was prepared under identical conditions. A portion of solution II was also diluted to 0.5% solids and applied to the filter paper. A comparison of the wet strength of untreated filter paper and filter paper impregnated with solutions I and II showed that the wet strength of the filter paper impregnated with solution I was superior to the other.

| Specimen: | Wet strength (lbs.) |
| --- | --- |
| Untreated | 0.2 |
| Treated with soln. I | 0.9 |
| Treated with soln. II | 0.3 |

(*b*) A portion of solution I prepared in part (*a*), was heated at 70°–80° C. for an additional 30 minutes. The clear solution became opaque and a solid settled out on cooling, indicating that a cross-linked thermoset resin had been produced. When a portion of solution II prepared in part (*a*) was heated at 70°–80° C. for an additional hour, the solution remained clear. No solid settled out on cooling. Under these conditions it is evident that the secondary amine groups of the aminolyzed polymer present in solution I, but not in II, have entered into a reaction with the formaldehyde, and with the methylol groups of the urea-formaldehyde resin produced in the solution, to give a cross-linked resin. When 10.5 parts of the polyamide described in Example 3 are added to solution II and heated for 1 hour at 70°–80° C. the cross-linking reaction is again evident indicating that the polymeric amide need not be present during the preparation of the resin.

*Example 11*

The procedure and composition of Example 10 is followed except that the urea there used is replaced with an equivalent amount of any of the other resin forming formaldehyde acceptors such as phenols and melamines as disclosed herein.

*Example 12*

An example of the reaction of the amides as described above with an epoxy group is the following:

A solution of 4.0 parts of an aminolyzed polymer prepared as described in Example 2 in 12.0 parts water was prepared at room temperature. This solution had a viscosity of 50–75 centipoises; 2 parts of epichlorohydrin were added to the solution. Within two minutes the solution had turned to a gel, incapable of being poured, indicating the rapidity with which the secondary amino groups present in the aminolyzed polymer had reacted with the epoxide groups in epichlorohydrin. This illustrates that minor proportions of the products of this invention can be used as cross-linking agents for resins containing reactable epoxy groups or that minor proportions of polyepoxides may be used to cross-link the products of this invention to form thermoset products.

It will be understood that it is intended to cover all changes and modifications of the examples of the invention herein chosen for the purpose of illustration which do not constitute departures from the spirit and scope of the invention.

We claim:

1. In making a polymeric amide, the process which comprises dissolving a polymer of a $C_1$–$C_4$ alkyl ester of an acid selected from the group consisting of acrylic and methacrylic acids and an N-aminoalkyl alkanol amine, the amine having 2–8 carbon atoms in each of the aminoalkyl and alkanol radicals, containing primary and secondary amine groups, and being used in amount providing in excess of 1 amine group for 1 mole of the said ester, in a liquid chemically inert to and a solvent for the said amine and ester and a non-solvent for the reaction product thereof, heating the resulting solution until a reaction product precipitates and until the precipitation substantially ceases, and then removing the said liquid from the said precipitated product, the said product being a water soluble polymeric amide.

2. The process of claim 1, the said ester being poly(methyl methacrylate) and the said amine being N-aminoethyl ethanol amine.

3. In making a polymeric amide the process which comprises reacting the final polymeric amide product of claim 1 with aqueous formaldehyde in the proportion of about 1–5 moles for each amide group in the said product, at a pH of 4–7 and a temperature of about 25°–100° C. and discontinuing the reaction before gelation occurs.

4. A water soluble polymeric amide having therein at least one secondary amine and one amide group for each ester group and being the polymer of recurring monomeric units of the formula

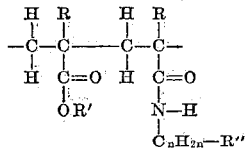

in which R represents a component selected from the group consisting of hydrogen, chlorine, and alkyls having 1–2 carbon atoms, R' is an alkyl having 1–4 carbon atoms, R'' is a radical selected from the group consisting of

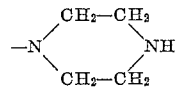

and $-NH-C_nH_{2n}OH$ and $n$ is an integral number within the range 2–8.

5. An epoxidized polymeric amide which consists essentially of the product of interaction between about 2 parts by weight of epichlorohydrin and 4 parts of the said polymeric amide of claim 4.

6. A polymeric amide consisting of the product of interaction of about 1 mole of N-aminoethylethanolamine, 1 mole of a $C_1$–$C_4$ alkyl ester of acrylic acid in polymerized condition, and styrene in the proportion of 5–15 parts by weight of the styrene for 100 of the said ester.

7. A polymeric amide consisting of the product of reaction of a copolymer of 1 mole of a $C_1$–$C_4$ alkyl ester of acrylic acid and styrene in the proportion of 5–15 parts by weight of the styrene for 100 of the said ester with about 1 mole of N-aminoethylpiperazine.

8. The polymeric amide of claim 4 in which R is hydrogen.

References Cited in the file of this patent
UNITED STATES PATENTS

| | | |
|---|---|---|
| 2,146,210 | Graves | Feb. 7, 1939 |
| 2,563,289 | Steinman | Aug. 7, 1951 |
| 2,806,018 | Price | Sept. 10, 1957 |
| 2,810,713 | Melamed | Oct. 22, 1957 |
| 2,845,408 | Melamed | July 29, 1958 |